United States Patent [19]

Fernsler

[11] 3,885,201

[45] May 20, 1975

[54] FAIL-SAFE HIGH VOLTAGE PROTECTION CIRCUIT

[75] Inventor: Ronald Eugene Fernsler, Indianapolis, Ind.

[73] Assignee: RCA Corporation, New York, N.Y.

[22] Filed: May 28, 1974

[21] Appl. No.: 473,860

[52] U.S. Cl. .................. 317/51; 178/7.5 R; 315/22; 331/20

[51] Int. Cl. .......................................... H04n 5/44

[58] Field of Search ........... 321/2 HF; 178/DIG. 11, 178/7.5 R, 7.5 D; 315/20, 22; 331/20; 358/74; 328/7; 317/51

[56] References Cited

UNITED STATES PATENTS

| | | | |
|---|---|---|---|
| 3,611,176 | 10/1971 | Christopher | 331/20 X |
| 3,692,932 | 9/1972 | Wilmarth | 315/22 X |
| 3,740,474 | 6/1973 | Dietz | 178/7.5 R |
| 3,813,580 | 5/1974 | Norman | 317/51 X |

*Primary Examiner*—James D. Trammell
*Attorney, Agent, or Firm*—Eugene M. Whitacre; Paul J. Rasmussen

[57] ABSTRACT

A fail-safe high voltage protection circuit for a television receiver includes means for rectifying pulses developed in the high voltage transformer for developing a direct current voltage proportional thereto for providing an additional bias voltage for the automatic frequency control (AFC) transistor. If the developed high voltage pulse becomes excessive, the corresponding increased bias supplied to the AFC transistor causes an increase in the horizontal oscillator frequency resulting in an unviewable raster.

6 Claims, 1 Drawing Figure

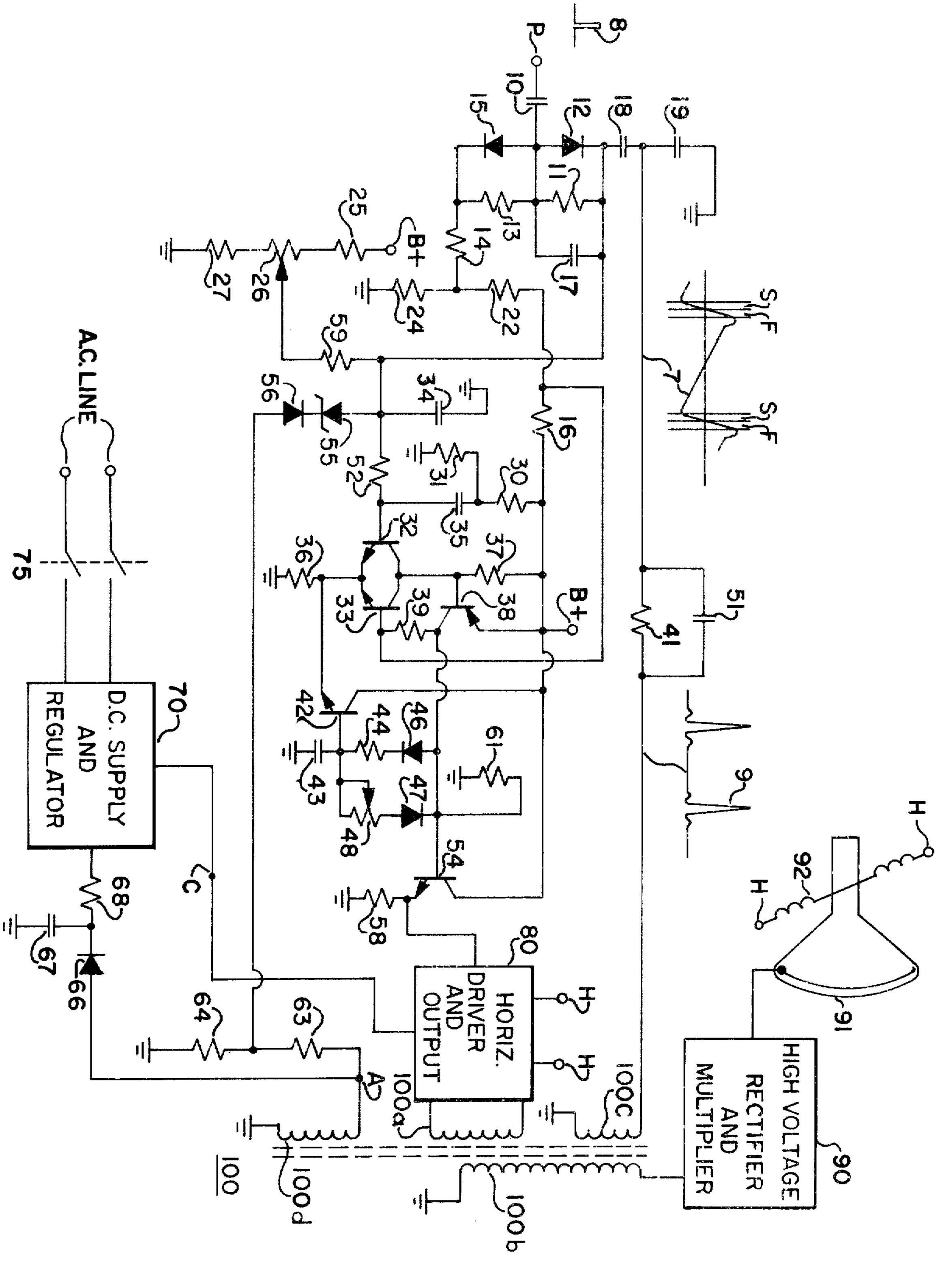
A.C. LINE
D.C. SUPPLY AND REGULATOR
HORIZ. DRIVER AND OUTPUT
HIGH VOLTAGE RECTIFIER AND MULTIPLIER

FAIL-SAFE HIGH VOLTAGE PROTECTION CIRCUIT

BACKGROUND OF THE INVENTION

The invention relates to a fail-safe high voltage hold-down circuit for use in television receivers.

Television receiver horizontal deflection and high voltage systems often employ high voltage hold-down circuits which protect receiver components from damage in the event of a receiver malfunction which could cause excessive high voltage to be developed for the receiver kinescope. Such circuits also aid in reducing the possibility of the development of harmful X-radiation from the kinescope in the event of such a malfunction.

Many of these high voltage hold-down systems sense the high voltage and cause horizontal oscillator automatic frequency control (AFC) voltage to change substantially when the high voltage exceeds a safe value thereby skewing the horizontal oscillator frequency. Changing the horizontal oscillator frequency disrupts the viewable raster produced on the kinescope giving the viewer an indication of an excessive high voltage malfunction.

Typically, however, these systems can be removed from circuit or bypassed in the receiver and the high voltage hold-down function can be neutralized.

SUMMARY OF THE INVENTION

In accordance with the invention, a high voltage protection circuit is provided for rendering a display on a kinescope unviewable when excessive high voltage is coupled thereto. The circuit includes a deflection generator, high voltage supply means coupled to the deflection generator for generating high voltage, and means coupled to the deflection generator for producing voltage variations representative of the generated high voltage variations. Power supply and regulating means are coupled to the deflection generator and to the means for producing voltage variations and responsive to the voltage variations for regulating direct current operating voltage supplied to the deflection generator for maintaining the generated high voltage substantially constant. The circuit further includes oscillator means coupled to the deflection generator and automatic frequency control means coupled to the deflection generator and to the oscillator for producing a first direct current control voltage for controlling the frequency of the oscillator. Means are coupled to the means for producing voltage variations representative of the high voltage variations and to the automatic frequency control means for providing a second direct current control voltage thereto. The first and second control voltages are combined for controlling the oscillator at a desired frequency and the second direct current control voltage is related in amplitude to the voltage variations for rendering the display on the kinescope unviewable when the amplitude becomes excessive corresponding to excessive high voltage.

The operation of the invention may best be understood by referring to the accompanying FIG. which illustrates a partly block and partly schematic diagram of a horizontal deflection and high voltage system embodying the invention.

DESCRIPTION OF THE PREFERRED EMBODIMENT

In the FIGURE, a horizontal sync signal 8 is coupled at a terminal P through a coupling capacitor 10 to a horizontal automatic frequency control (AFC) circuit comprising a pair of detecting diodes 12 and 15, a pair of resistors 11 and 13, a capacitor 17, a pair of coupling capacitors 18 and 19, and an integrating network comprising a capacitor 51 and a resistor 41. The AFC network is coupled to a horizontal hold control network comprising a resistor 59 coupled to the arm of a potentiometer 26 which is coupled in series with a pair of resistors 25 and 27 between a source of direct current operating voltage B+ and ground.

The junction of the horizontal hold control and AFC network is coupled to an AFC voltage storage capacitor 34 and through a decoupling resistor 52 to an AFC filter network comprising a capacitor 35 and a resistive voltage divider network including resistors 30 and 31 coupled between B+ and ground. Resistor 52 is also coupled to the base of an AFC transistor 32. AFC transistor 32 is coupled in differential configuration with a horizontal oscillator switch transistor 33.

The collectors of transistors 32 and 33 are coupled to the base of a transistor 38 and through a collector resistor 37 to the B+ voltage supply. The joined emitters of the differential pair are coupled through an emitter resistor 36 to ground. Another switch transistor 42 has its emitter coupled to the joined emitters of transistors 32 and 33. The collector of transistor 42 is coupled directly to the B+ supply.

The emitter of transistor 38 is coupled to the B+ supply and its collector is coupled through a resistor 39 to the base of transistor 33. A second voltage divider network comprising resistors 16, 22 and 24 is coupled between the B+ supply and ground. Base bias for transistor 33 is supplied from the junction of resistors 16 and 22. The AFC offset voltage which is slightly lower than the base bias of transistor 33 is supplied from the junction of resistors 22 and 24 through a resistor 14 to the AFC network. The collector of transistor 38 is coupled to a time constant circuit comprising a pair of diodes 46 and 47, a resistor 44, a potentiometer 48 and a capacitor 43. Capacitor 43 is coupled between ground and the base of transistor 42.

The collector of transistor 38 is also coupled to the base of a buffer transistor 54 and through a resistor 61 to ground. The collector of transistor 54 is coupled to the B+ supply. The emitter of transistor 54 is coupled through a resistor 58 to ground. Horizontal deflection triggering signals are coupled from the emitter of transistor 54 to a conventional horizontal driver and output stages 80.

A pair of horizontal deflection windings 92 associated with a kinescope 91 are coupled to a horizontal output stage in block 80 at terminals H—H. Block 80 is coupled to a first winding **100*a* of a horizontal output transformer 100. A high voltage winding 100*b* of horizontal output transformer 100 is coupled between ground and a high voltage rectifier and multiplier 90 which is coupled to kinescope 91 for providing high voltage thereto. An AFC pulse winding 100*c* of transformer 100 is coupled between ground and the integrating network comprising elements 41 and 51 for supplying retrace voltage waveform 9** thereto.

An additional winding **100*d* of horizontal output transformer 100 is coupled between ground and point A. A resistive voltage divider comprising resistors 63 and 64** is coupled between point A and ground. Rectifying, filtering and storage means comprising a diode 66, a capacitor 67 and a resistor 68 rectify retrace pulses appearing at point A to develop a direct current voltage across capacitor 67. A direct current voltage supply and regulator 70 is coupled to the rectifying, filtering and storage network, to the alternating current line supply through a receiver on-off switch 75 and to horizontal driver and output stages 80 at terminal C.

Direct current voltage supply and regulator 70 contains means for rectifying and filtering the alternating current line voltage for providing B+ direct current operating voltage for the illustrated horizontal deflection system. Regulator 70 is controlled by the direct current voltage across capacitor 67 to regulate the direct current operating voltage supplied at terminal C to the horizontal output stage in block 80 for insuring that the retrace voltage pulse appearing at terminal A will be substantially constant during operation of the horizontal deflection system. The junction of resistors 63 and 64 is coupled through a rectifier diode 56 and a reference voltage zener diode 55 to the junction of resistors 52 and 59.

The horizontal oscillator and AFC circuit illustrated in the FIGURE is similar to that described in U.S. Pat. No. 3,611,176 issued to Todd J. Christopher. The operation of the circuit will be briefly described here to aid in understanding the present invention.

When the horizontal deflection system illustrated in the FIGURE is first energized, the AFC operating voltage is set by the resistive voltage divider comprising resistors 16, 22 and 24. This voltage causes corresponding voltages to appear across capacitors 17 and 34. A slightly higher positive voltage provided by the drop across resistor 22 is supplied to the base of transistor 33 which is thus rendered conductive.

The resulting voltage drop across resistor 37 in the collector circuit of transistors 33 and 32 drives transistor 38 into saturation, causing approximately B+ potential to appear at its collector. Transistor 54 also becomes conductive, causing horizontal deflection triggering potential to appear across resistor 58. Capacitor 43 begins to charge from the collector voltage of transistor 38 through forward biased diode 46 and resistor 44. When the voltage across capacitor 43 exceeds the base voltage of transistor 33, transistor 42 becomes conductive, turning off transistors 33, 32 and 38.

The collector voltage of transistor 38 is less positive when transistor 38 is not conducting, thereby turning off transistor 54 and removing drive signal from horizontal driver and output stage 80. Capacitor 43 begins to discharge through potentiometer 48, diode 47 and resistor 61. When capacitor 43 has discharged sufficiently, transistor 42 becomes non-conductive allowing transistor 32 or 33 to become conductive as determined by the AFC control voltage. Conduction by either transistor 32 or 33 initiates the next charging interval for capacitor 43, the next conductive interval for transistor 54 and the next triggering signal across resistor 58 for horizontal driver and output stage 80.

It may be seen that the duty cycle of the horizontal oscillator and AFC circuit comprising transistors 32, 33, 38, 42 and 54 and their associated circuitry may be varied by varying the relative values of resistor 44 and potentiometer 48. For sufficiently short duty cycle, i.e., resistance of potentiometer 48 substantially larger than resistance of resistor 44, diode 47 may not be necessary.

After the first few horizontal deflection cycles, substantial retrace pulse voltage will appear at terminal A and across winding 100c. The voltage appearing across winding 100c will be integrated to form a sawtooth of voltage illustrated by waveform 7 across capacitor 19. The voltage thereacross will be compared with horizontal sync pulse 8 coupled to terminal P. If the horizontal oscillator is in sync with pulse 8, pulse 8 will appear half in region S of waveform 7 and half in region F. If more than half of sync pulse 8 occurs in region S of waveform 7, diode 12 will conduct for more than half of the interval of sync pulse 8 causing the voltage across capacitor 34 to become more positive, increasing the base voltage of AFC transistor 32 and causing it to be biased closer to conduction. This will result in increasing the frequency of the horizontal oscillator and AFC circuit.

If more than half of sync pulse 8 occurs within region F of the signal illustrated by waveform 7, diode 12 will remain reverse biased for more than half of the interval of sync pulse 8 and the voltage at the transistor 32 will not rise as much. This will result in less bias being provided at the base of AFC transistor 32, holding that transistor out of conduction for slightly longer and decreasing the frequency of the horizontal oscillator and AFC circuit.

Another source of bias voltage for AFC transistor 32 is the horizontal hold control series voltage divider comprising resistors 25, 26 and 27. The contribution of this series circuit to the potential at the base of AFC transistor 32 is supplied through resistor 59. Additional bias is supplied to the AFC transistor through rectifier 56 and zener diode 55 from the substantially constant voltage pulse established at terminal A by virtue of the previously described action of regulator 70.

The substantially constant amplitude retrace voltage pulse appearing across resistor 64 is rectified by diode 56. A portion of this voltage is then dropped across zener diode 55. The remaining potential helps to establish the voltage across capacitor 34 which, when filtered by the AFC filter network comprising capacitor 35 and resistors 52, 30 and 31, establishes the correct bias on the base of AFC transistor 32.

The horizontal oscillator will start without the proper base bias for AFC transistor 32. The first several cycles of operation of the oscillator and the resultant operation of horizontal driver and output stage 80 increase the voltage across capacitor 34 to provide sufficient bias to the base of AFC transistor 32 diode allow it to begin to function to control the horizontal oscillator frequency. This increase in voltage is effected by rectifying the retrace voltage pulses appearing across resistor 64 in didoe 56. However, if regulator 70 begins to malfunction for any reason, allowing an excessive retrace voltage pulse to be generated across high voltage winding 100*b*, a retrace voltage pulse directly proportional to that excessive high voltage pulse will be developed at terminal A. Such a pulse will result in increased potential being supplied to capacitor 34 and to the base of AFC transistor 32. This excessive base bias voltage will force AFC trensistor 32 to drive the horizontal oscillator comprising transistors 33, 38 and 42 and their associated components high in frequency. This increase in frequency will cause the horizontal driver and output stages to run at a higher frequency, rendering the raster unviewable, and in transistor horizontal deflection systems, preventing further increases in the high voltage coupled to kinescope 91 from high voltage rectifier and multiplier 90.

If a short occurs in zener diode 55, the voltage across capacitor 34 will increase, pulling the horizontal oscillator high in frequency. If zener diode 55 is open circuited, the bias supplied to the base of AFC transistor 32 will be reduced, pulling the horizontal oscillator frequency lower. If rectifier 56 is either short or open circuited, the bias voltage at the base of AFC transistor 32 will be reduced, pulling the horizontal oscillator low in frequency. If resistor 63 is open circuited or resistor 64 is short circuited, the base bias of AFC transistor 32 will be pulled low, causing the horizontal oscillator frequency to decrease. If resistor 63 is shorted or resistor 64 is open circuited, the base bias of AFC transistor 32 will increase, causing the horizontal oscillator frequency to increase. Resistors 25, 26 and 27 must, of course, be chosen such that the voltage available from horizontal hold control potentiometer 26 is insufficient to provide the correct bias at the base of AFC transistor 32 to allow the horizontal oscillator to run at the correct horizontal frequency in the event of the aforementioned malfunctions. The proper values may be selected by considering the maximum and minimum voltages which can be provided by the AFC circuit comprising diodes 12 and 15 and their associated components and the maximum allowable amplitude of the retrace voltage pulse across high voltage winding **100*b*** and the corresponding maximum amplitude pulse which will result at terminal A.

Zener diode 55 may be replaced by a large-valued resistor to achieve a similar result. The advantage of using a zener diode rather than a resistor is that the voltage drop across the zener diode in reverse conduction is more predictable than that across a resistor.

For horizontal deflection systems such as the dual SCR system described in U.S. Pat. NO. 3,452,244 issued to W. F. W. Dietz which require a slowing of the horizontal oscillator to prevent an increase to excessive levels of the kinescope anode voltage, a similar system may be used. To decrease the horizontal oscillator frequency, a horizontal output transformer winding may be provided which supplies a negative-going horizontal retrace pulse. This negative-going pulse may then be retrace rectified in a diode poled for conduction opposite the direction of conduction of diode 56. Similarly, a zener diode would be poled for reverse breakdown in a direction opposite the reverse direction of zener diode 55. An excessive negative voltage will thus be provided which, when added to the other voltages supplied across capacitor 34, will reduce the horizontal oscillator frequency.

What is claimed is:

1. A high voltage protection circuit for rendering a display on a kinescope unviewable when excessive high voltage is coupled thereto, comprising:

a deflection generator;

high voltage supply means coupled to said deflection generator for generating said high voltage;

means coupled to said deflection generator for producing voltage variations representative of said generated high voltage variations;

power supply and regulating means coupled to said deflection generator and to said means for producing voltage variations and responsive to said voltage variations for regulating direct current operating voltage supplied to said deflection generator for maintaining said generated high voltage substantially constant;

oscillator means coupled to said deflection generator;

automatic frequency control means coupled to said deflection generator and to said oscillator for producing a first direct current control voltage for controlling the frequency of said oscillator; and means coupled to said means for producing voltage variations representative of said high voltage variations and to said automatic frequency control means for providing a second direct current control voltage thereto, said first and second control voltages being combined for controlling said oscillator at a desired frequency and said second direct current control voltage being related in amplitude to said voltage variations for rendering the display on said kinescope unviewable when said amplitude becomes excessive corresponding to excessive high voltage.

2. A high voltage protection circuit according to claim 1 wherein said means coupled to said deflection generator for producing voltage variations representative of said generated high voltage is a winding of a deflection output transformer.

3. A high voltage protection circuit according to claim 1 wherein a third direct current control voltage comprising an oscillator hold control voltage is coupled to said oscillator and automatic frequency control means in addition to said first and second direct current control voltages.

4. A high voltage protection circuit for rendering a display on a kinescope unviewable when excessive high voltage is coupled thereto, comprising:

a first control loop comprising:

a horizontal deflection generator including switching means for generating deflection current in a deflection winding in response to control signals coupled thereto;

high voltage generating means coupled to said deflection generator for generating high voltage for said kinescope in response to said switching;

means coupled to said high voltage generating means for generating voltage variations representative of said generated high voltage;

voltage supply and regulating means coupled to said deflection generator and to said means for generating voltage variations representative of said generated high voltage for supplying direct current operating potential to said deflection generator which varies in relation to said voltage variations representative of said generated high voltage for maintaining said generated high voltage substantially constant; and a second control loop comprising:

said deflection generator;

said high voltage supply means;

said means for generating voltage variations representative of said generated high voltage;

oscillator means coupled to said deflection generator;

automatic frequency control means coupled to said deflection generator and to said oscillator for producing a first direct current control voltage for controlling the frequency of said oscillator; and means coupled to said means for generating voltage variations representative of said generated high voltage and to said automatic frequency control means for providing a second direct current control voltage thereto, said first and second control voltages being combined for controlling said oscillator at a desired frequency and said second direct current control voltage being related in amplitude to said variations for rendering the display on said kinescope unviewable when said high voltage becomes excessive.

5. A high voltage protection circuit according to claim 4 wherein said means coupled to said high voltage generating means for generating voltage variations representative of said generated high voltage is a winding of a deflection output transformer.

6. A high voltage protection circuit according to claim 4 wherein a third direct current control voltage comprising an oscillator hold control voltage is coupled to said oscillator and automatic frequency control means in addition to said first and second direct current control voltages.

* * * * *